(12) United States Patent
Roberts

(10) Patent No.: US 6,302,652 B1
(45) Date of Patent: Oct. 16, 2001

(54) ELLIPTICAL PROPELLER AND WINDMILL BLADE ASSEMBLY

(75) Inventor: John Edward Roberts, Los Altos, CA (US)

(73) Assignee: General Dynamics Government Systems Corporation, Mountain View, CA (US)

( * ) Notice: Subject to any disclaimer, the term of this patent is extended or adjusted under 35 U.S.C. 154(b) by 0 days.

(21) Appl. No.: 09/220,715

(22) Filed: Dec. 24, 1998

(51) Int. Cl.⁷ ....................................................... B63H 1/26
(52) U.S. Cl. ............................................. 416/228; 416/243
(58) Field of Search ................................ 416/228, 197 A, 416/235, 237, 238, 242, 243, 223 R, DIG. 5; 415/905, 906, 907

(56) References Cited

U.S. PATENT DOCUMENTS

| | | | | |
|---|---|---|---|---|
| 3,580,210 | * | 5/1971 | Svensen | 115/5 |
| 3,768,922 | * | 10/1973 | Dixon | 416/61 |
| 3,989,406 | * | 11/1976 | Bliss | 415/1 |
| 4,304,524 | * | 12/1981 | Coxon | 416/131 |
| 4,359,311 | * | 11/1982 | Benesh | 416/197 A |
| 4,488,399 | * | 12/1984 | Robey et al. | 60/262 |
| 4,838,757 | * | 6/1989 | Benesh | 415/4.4 |

FOREIGN PATENT DOCUMENTS

410129590 * 5/1998 (JP) .

OTHER PUBLICATIONS

Cavallo, Alfred J.; Hock, Susan M.; Smith, Don R.; "Wind Energy: Technology and Economics", Chapter 3 in Renewable Energy: Sources for Fuels and Electricity, 1993, NY, Island Press, pp. 121–135.*
Bristish Patent application No. 2316980, Nov. 1998.*
Streeter, Victor L. and Wylie, E. Benjamin, Fluid Dynamics, 8$^{th}$ Edition, McGraw–Hill, NY © 1985, pp. 116–126, 164–172.

* cited by examiner

Primary Examiner—Edward K. Look
Assistant Examiner—Ninh Nguyen
(74) Attorney, Agent, or Firm—Jenner & Block, LLC

(57) ABSTRACT

Non-planar propellers or windmill blade assemblys are proposed which have tips that are curved to point in the same direction as the axis of rotation of the propeller. This non-conventional design results in a stronger, stiffer, and more efficient propeller or windmill.

7 Claims, 6 Drawing Sheets

ELLIPTICAL PROPELLER AND WINDMILL BLADE ASSEMBLY

BACKGROUND OF THE INVENTION

1. Field of the Invention

This application relates to the field of fluid dynamics and more particularly to the field of propellers or windmills.

2. Description of Related Art

Propellers are able to propel objects by exploiting the principle of conservation of total linear momentum. Propeller blades accelerate fluid so that the speed of the fluid entering the propeller is lower than the speed of the fluid exiting. The propeller, and whatever is attached thereto, must therefore move in the forward direction to ensure the conservation of total linear momentum. Because of this difference in fluid speeds, the concentration of streamlines at the rear of the propeller blades is higher than at the front. Or, what is the same, A1>A2, where A1 and A2 are the cross-sectional areas, perpendicular to the streamlines, of a tube of flow fore and aft of the propeller. The larger the ratio A1/A2, the more energy can be put into the airstream.

In conventional blades, however, blade tip vortices and other inefficiencies are introduced as the fluid near the blade tips escapes from the rear to the front. These tip losses result in a diminution of A1/A2. I.e., these tip losses reduce the concentration of the streamlines at the rear of the propeller and increase the concentration at the front, leading to undesirable loss of thrust and efficiency.

Another problem shared by conventional propellers is that the optimum blade size needed to produce the required thrust is often too large to allow the propeller to turn. For example, the size of a propeller producing the required thrust for an airplane may be too large to clear the tarmac while rotating. Or, in another example, the optimum blade size producing the desired thrust for a boat may be such as to impede proper functioning of a boat propeller in shallow water. While truncating the blades would solve the aforementioned problem, this truncation may result in more tip loss and less efficiency. Also, as blade diameter increases, a gearbox ratio also increases, adding weight and reducing efficiency.

SUMMARY OF THE INVENTION

The present invention addresses the aforementioned problems by introducing blades which, unlike the conventional shape, are not planar. Rather, the tips have a directional component that points in the direction of airflow. By shaping the blade tips into a curve having a continuous tangent, tip vortices are reduced and, with the appropriate profiles and pitch angles, more efficient operation can result. Curving the blades also recaptures the lost blade area that truncation loses.

The blade tips can be bent so as to point in approximately the same direction as the axis of rotation. By curving the blades in an approximately semi-elliptical shape in this fashion, air may be drawn from outside the semi-ellipsoidal envelope (open end facing downstream for propellers) by the blade tips to accelerate the airflow already established by the portions of the blade closer to the hub. By employing semi-elliptically shaped blades, then, the concentration of streamlines in front of the propeller is decreased while the concentration at the back is increased. The ratio A1/A2 is therefore augmented. These modifications result in a more efficient and ideal propeller.

The above considerations also apply to windmills. Here, however, it is desirable to harness the wind's energy to turn the blades. I.e., in contrast to propellers, windmills are designed to reduce the wind speed as the air traverses the blades. Curving the blades in a semi-ellipsoidal manner as described above, while making the blades' angles of attack have the opposite sign as those of a propeller, results in more efficacious operation. The curved shape serves as a virtual venturi with the windmill at the neck of this venturi.

Adopting a curved propeller shape described above may permit the attainment of the same thrust as a conventionally shaped propeller, but with less blade material. This feature not only permits more compact operation, but also reduces costs in the manufacturing process. Moreover, because the propeller or windmill of the present invention would be expected to have a smaller moment of inertia, the same torque exerted on the blades would produce a greater angular acceleration than in conventional models.

DETAILED DESCRIPTION OF THE PREFERRED EMBODIMENT(S)

Figure 1:
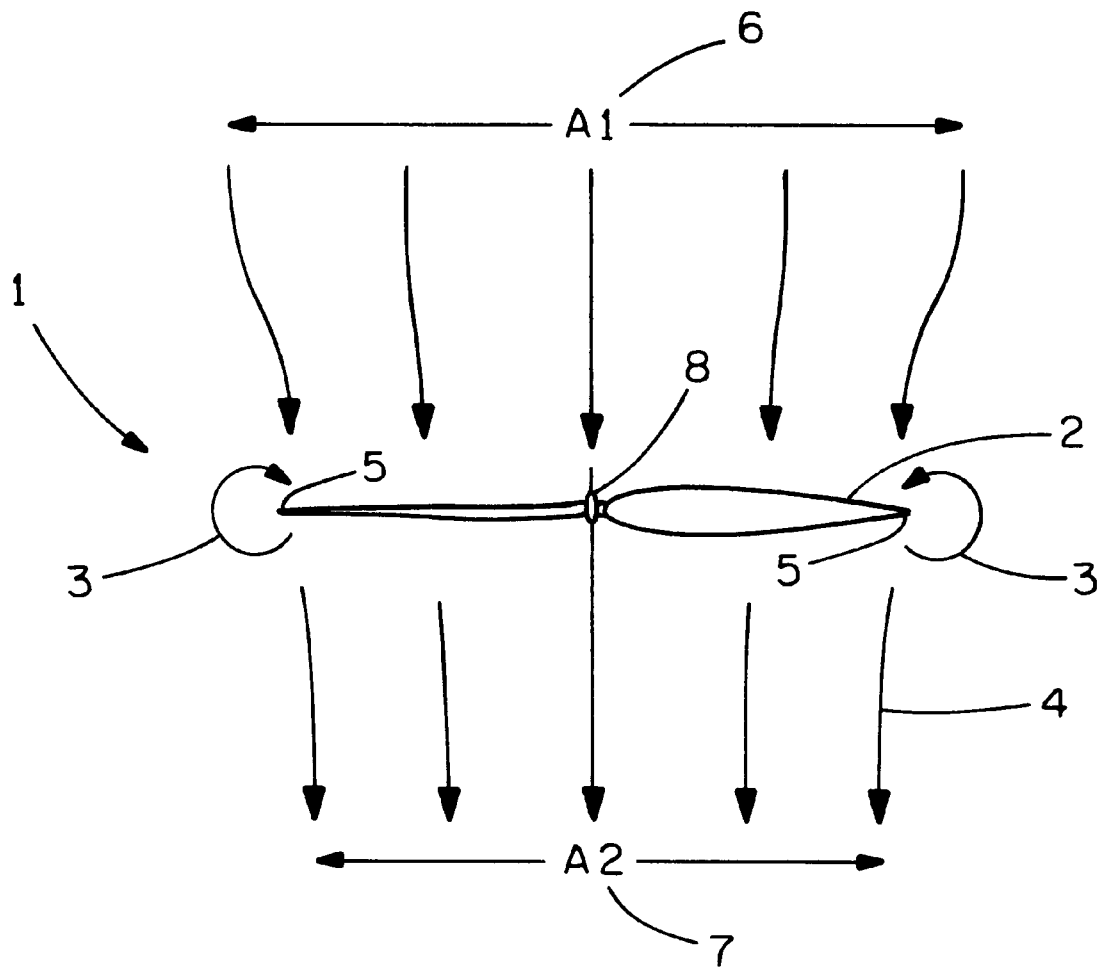
FIG. 1 is a side view of conventional propeller blades including streamlines.

FIG. 1 is a side view of a conventionally shaped propeller 1 with a hub 8. A plurality of streamlines 4 are seen to run through a plurality of propeller blades 2. A plurality of tip vortices 3 are present near a pair of blade tips 5. A1 6 and A2 7 are the cross-sectional areas, perpendicular to the streamlines 4, of a tube of flow fore and aft of the propeller 1.

Figure 2:
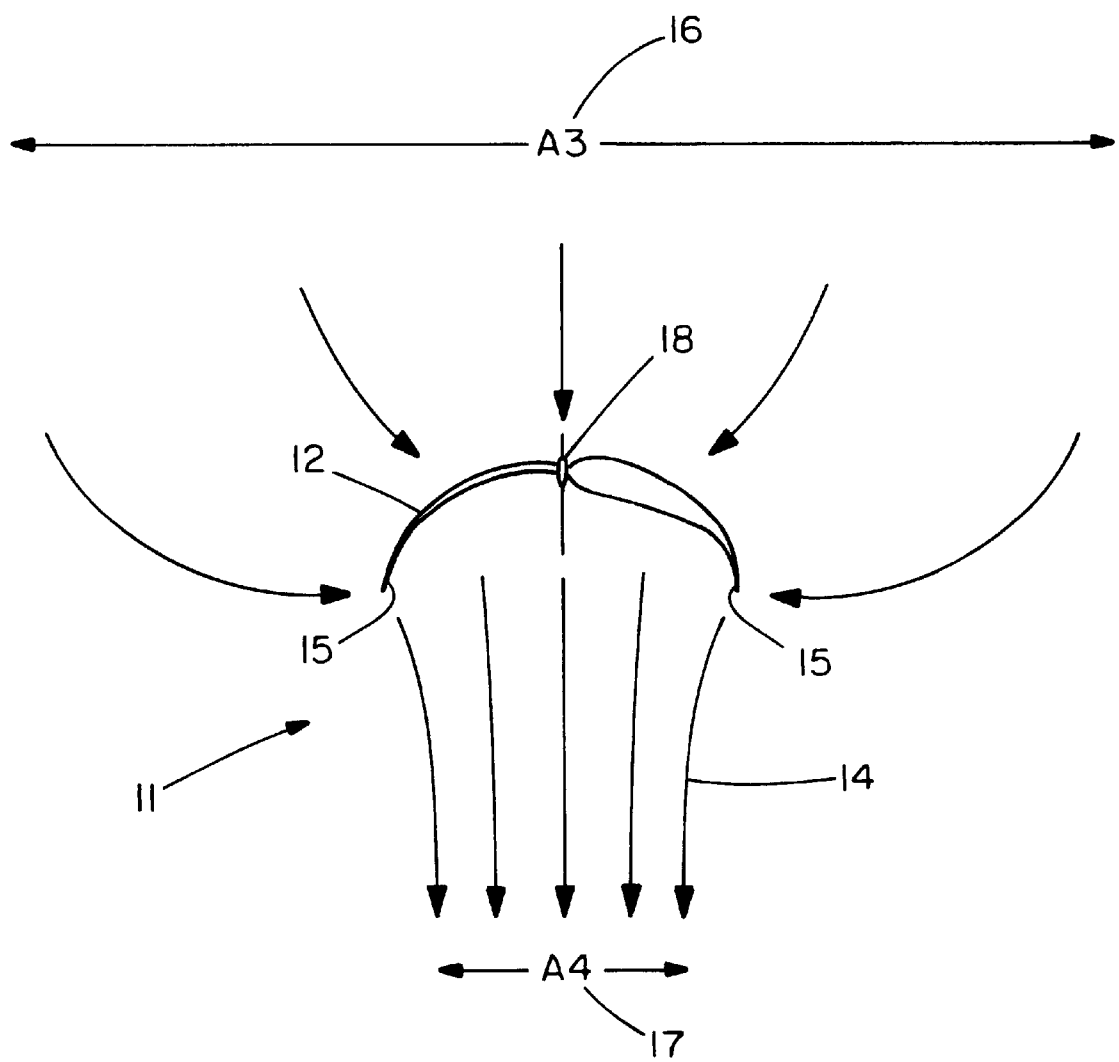
FIG. 2 is a side view of the propeller of the present invention including streamlines.

FIG. 2 is a side view of a propeller 11 according to the present invention with a hub 18. A plurality of streamlines 14 are seen to run through a pair of curved propeller blades 12. A pair of blade tips 15 appear at an end of each of the blades 12. A3 16 and A4 17 are the cross-sectional areas, perpendicular to the streamlines 14, of a tube of flow fore and aft of the propeller 11.

In a preferred embodiment, crankshaft (not shown) is attached either directly or indirectly to a hub 18 and delivers necessary power to turn the propeller 11. The blade tips 15 point in the backward direction, although this is not necessary: it is also possible to have curved blades, although with tips not pointing in the backward direction. The shape of the blades may approximate portions of an ellipse (including a circle), catenary, or parabola. Moreover, the slope of the curve described by the blade 12 need not be monotonically increasing or decreasing; curves with inflection points, a double recurve bow, for example, are thus possible. In addition, the blade 12 may be made up of a plurality of substantially straight sections of changing angle.

The streamlines 14 illustrate a feature of the present invention. By curving the blade tips 15 smoothly to align with the air flow, tip vortices may be reduced and, with appropriate profiles and pitch angles to be discussed below, the ratio A1/A2 may be increased. As a consequence, more efficient operation of the propeller results.

The propeller of the present invention need not have rotational symmetry about the axis of rotation. For example, although FIG. 2 depicts a propeller with two blades. according to the present invention a propeller having any number of blades, including a single curved blade, is possible. In some instances, however, it may be useful to include appropriate counter weights.

Figure 3:
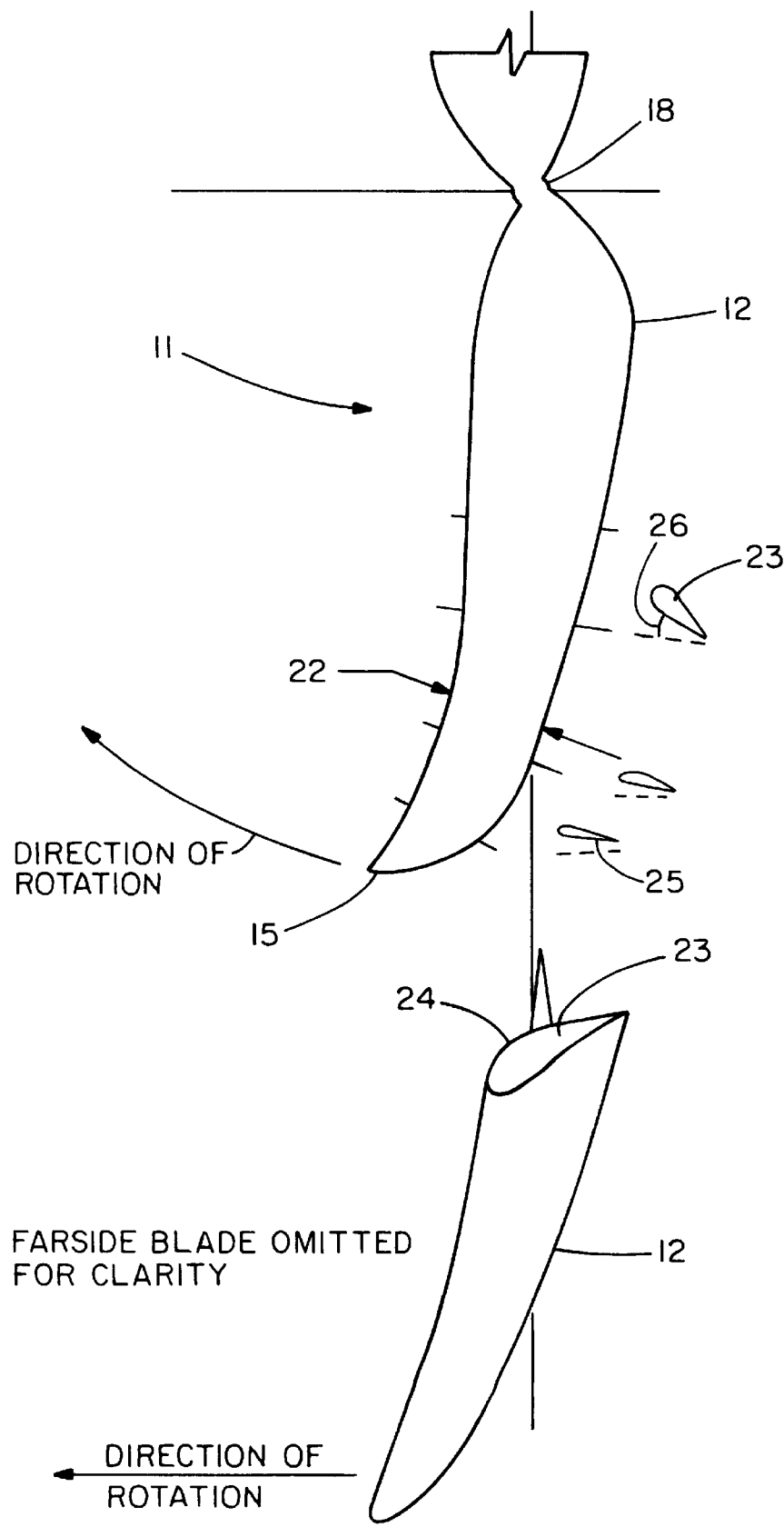
FIG. 3 is a front view of the propeller of the present invention including cross sections of the blades.

FIG. 3 is a front view of the propeller 11 of the present invention. In a preferred embodiment, the blade 12 is of a scimitar shape, although other shapes are also possible. Also shown is a chord 22 of a cross sections 23 of the blade 12 at various distances from the hub 18. The shape of the cross section 23 is approximately that of an airplane wing, with a thick leading edge, and a thin trailing edge. A blade back 24 is the curved portion similar to the top of an airplane wing, while a blade face 25 is relatively flat and is analogous to the bottom of an airplane wing. A pitch angle 26, which is an angle formed between the plane perpendicular to a forward direction and the chord 22, is also shown. In a preferred embodiment, the pitch angle 26 increases from the tip 15 to the hub 18.

A high-pitch propeller can move a greater distance with each revolution than a low-pitch propeller. However, with a high-pitch propeller, the crankshaft may have to exert a greater torque to achieve the same angular acceleration as a low-pitch propeller. Therefore, in situations like take-offs and climbs, where quick acceleration is required, a low-pitch propeller is best for the job. At cruising speeds, when no acceleration is required, a high-pitch propeller is ideal. In a preferred embodiment of the present invention, a compromise is struck.

Alternatively, in an other embodiment of the present invention, the propeller may be of the variable pitch variety. As would be recognized by a person of ordinary skill in the art, these types of propellers may be either adjustable or controllable. In the former, the pitch angle of the propeller may be adjusted by a technician when the propeller is not rotating. In the latter, the pitch angle may be adjusted electrically or hydraulically while the propeller is in operation to suit the circumstances. Adjustments to variable pitch propellers may or may not be done automatically.

By employing a scimitar shape for the blades, the propeller may enjoy some of the lift and drag advantages of a variable pitch variety in a passive system. These advantages result, in part, from the centrifugal forces imparted on the scimitar and other curve shaped blades as the propeller is rotating.

The present invention may not be limited to airplane propellers. Enclosed ducts, jet engine fans, air cushion vehicles, helicopter rotors, propfans, and boat propellers may profit from the present invention. These applications involve both "pushing" and "pulling."

Figure 4:
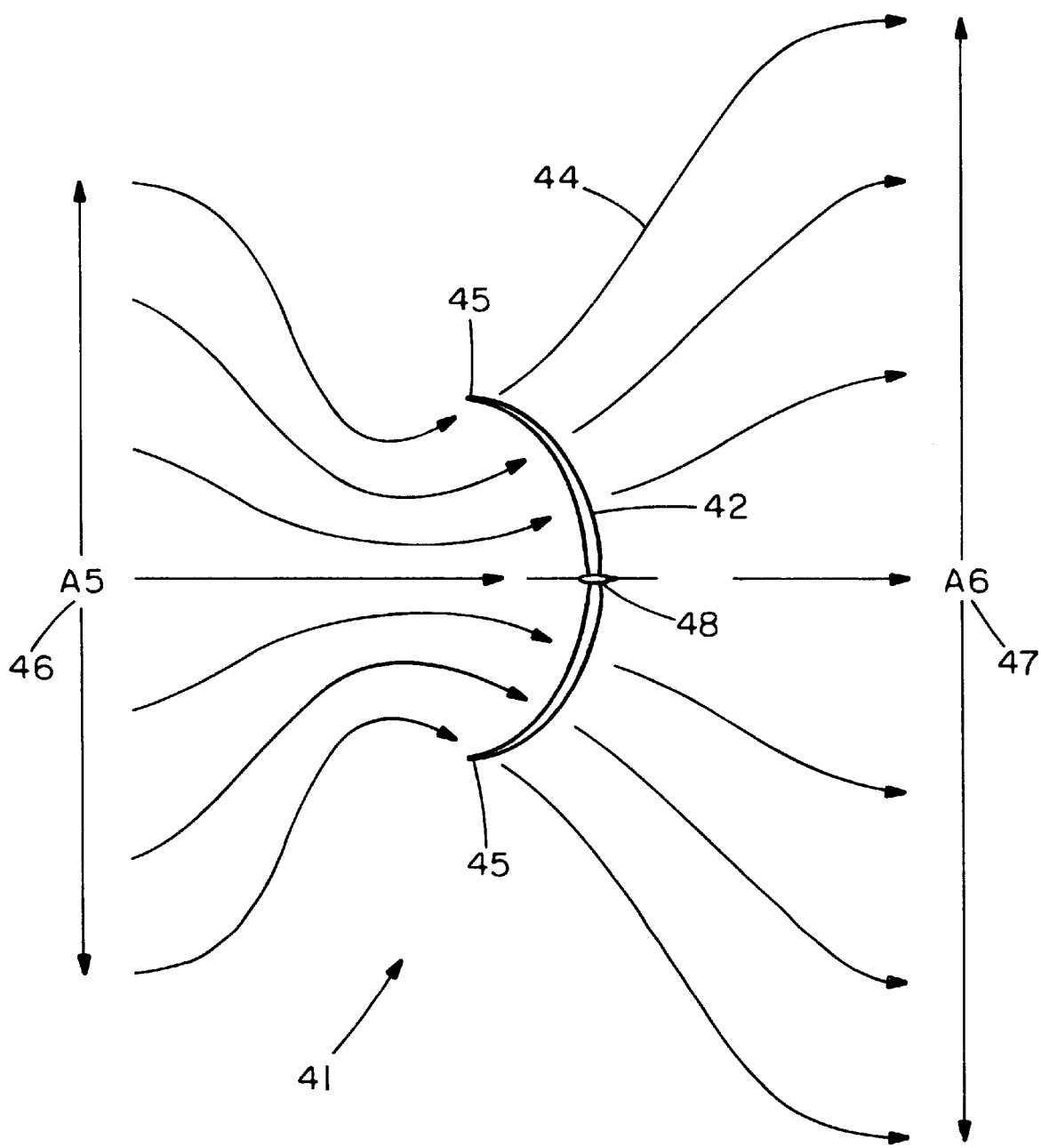
FIG. 4 is a side view of the windmill of the present invention including streamlines.

The present invention may also be used in connection with windmills. FIG. 4 shows a side view of a windmill blade assembly 41 according to the present invention with a hub 48. Streamlines 44 are seen to run through curved windmill blades 42. Blade tips 45 appear at the end of each of the blades 42. A5 46 and A6 47 are cross-sectional areas, perpendicular to the streamlines 44, of a tube of flow fore and aft of the windmill blade assembly 41. The change in kinetic energy of the wind after passing the windmill blades 42 is approximately the negative of the work done on the windmill blade assembly 41 by the wind. To obtain good efficiency of the windmill, the ratio A6/A5 could be increased to approximately 1.5.

Figure 5:
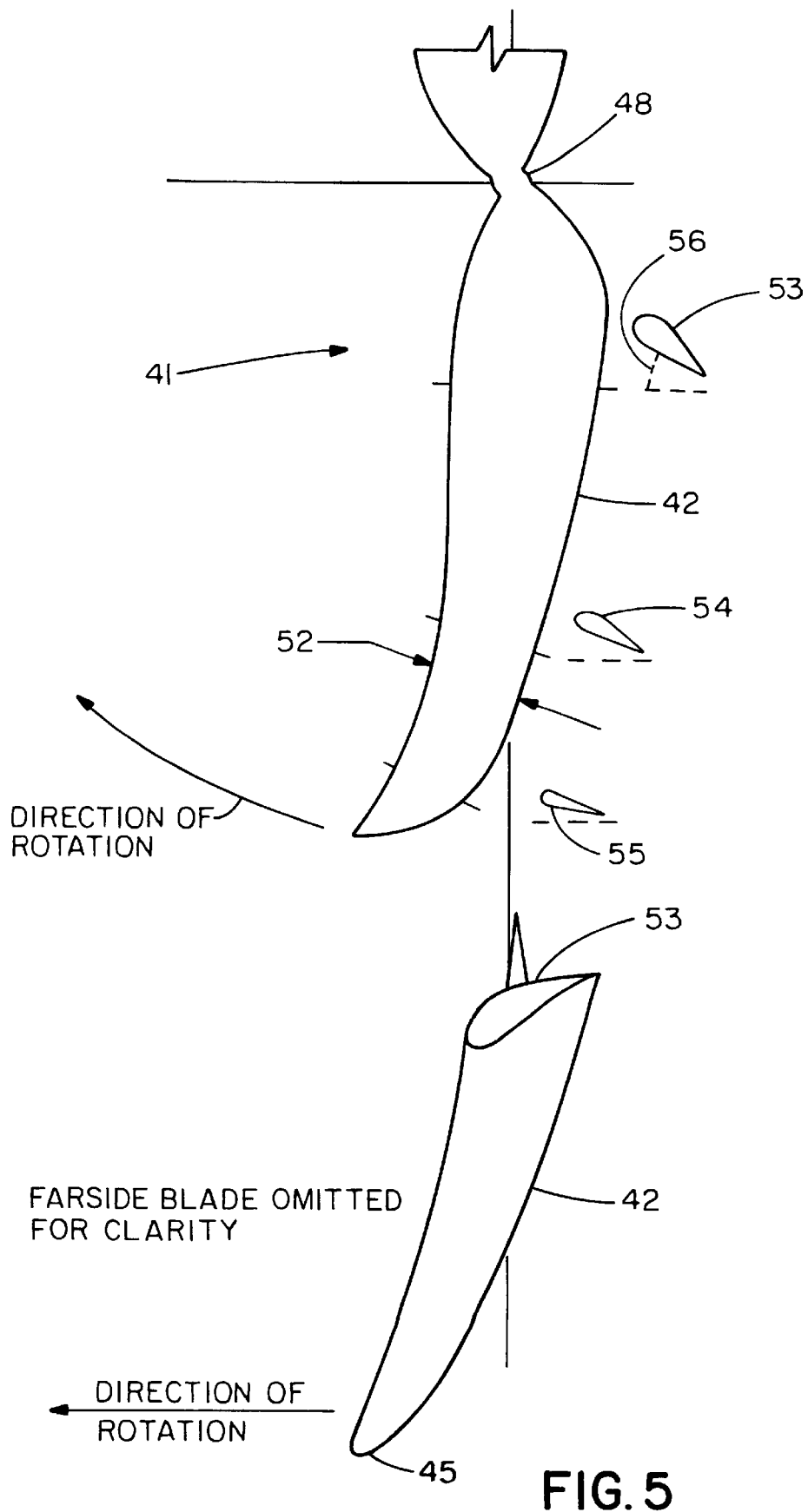
FIG. 5 is a front view of the windmill of the present invention including cross sections of the blades.

FIG. 5 depicts a front view of the windmill blade assembly 41 of the present invention. In a preferred embodiment, the blade 42 is of a scimitar shape, although other shapes are also possible. Also shown is a chord 52 of a cross sections 53 of the blade 42 at various distances from the hub 48. The shape of the cross sections 53 can be that of an airplane wing with a thick leading edge, and a thin trailing edge. A blade back 54 is the curved portion similar to the top of an airplane wing, while a blade face 55 is relatively flat and is analogous to the bottom of an airplane wing. A pitch angle 56 is also shown. In a preferred embodiment, the pitch angle 56 increases from the tip 45 to the hub 48.

In a preferred embodiment, a drive shaft (not shown) is attached either directly or indirectly to the hub 48 and delivers necessary power to turn the blade assembly 41. The blade tips 45 point in the forward direction, although this is not necessary: it is also possible to have curved blades, although with tips not pointing in the forward direction. The shape of the blade 42 may approximate portions of an ellipse (including a circle), catenary, or parabola. Moreover, the slope of the curve described by the blade 42 need not be monotonically increasing or decreasing, curves with inflection points, a double recurve bow, for example, are thus possible. In addition, the blade 42 may be made up of a plurality of substantially straight sections of changing angle.

The blade assembly of the present invention need not have rotational symmetry about the axis of rotation. For example, although FIG. 4 depicts a blade assembly with two blades, according to the present invention a blade assembly having any number of blades, including a single curved blade, is possible. In some instances, however, it may be useful to include appropriate counter weights.

Although in some cases it may be possible to fashion the propellers and the windmill blade assemblys of the present invention starting from conventional aluminum propellers or windmill blade assemblys, in a preferred embodiment, the blades may be constructed from scratch in a manner that would be straight-forward to one of ordinary skill in the art given the description provided herein. Besides aluminum, carbon fiber reinforced epoxy may also be used to make the blades. An advantage of carbon fiber reinforced epoxy is that it has a better fatigue life and results in blades whose deflection is easier to tailor. Carbon fiber reinforced epoxy blades also last long, but may be more expensive and harder to make.

Figure 6:
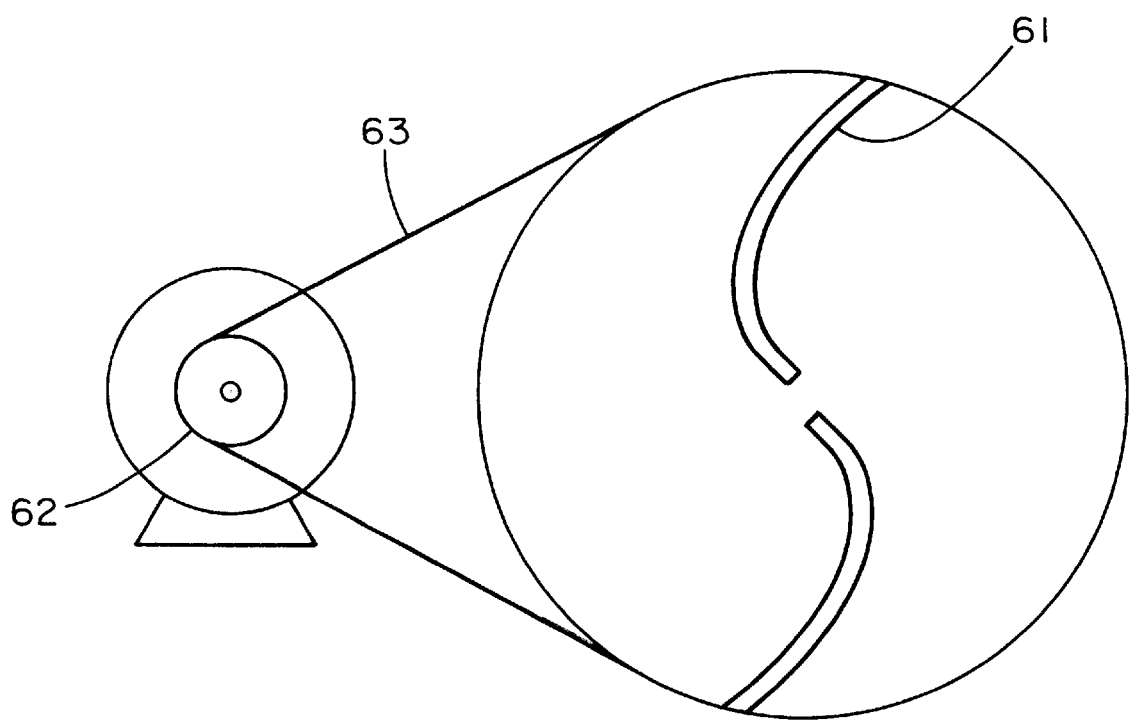
FIG. 6 is a hubless propeller or windmill blade assembly of the present invention including a front view of the blades.

Although the descriptions of the propeller and windmill blade assembly have thus far included hubs, hubless designs are also possible. FIG. 6 depicts a hubless propeller or windmill blade assembly having blades 61, shaft 62, and coupling 63, which can be, for example, a belt. Applications of such hubless designs include coaxial ducts and air cushions. Via the coupling 63, the blades 61 either are driven by the shaft 62, in the case of a propeller, or help drive the shaft, in the case of a windmill.

While the invention has been disclosed in connection with the preferred embodiments shown and described in detail, various modifications and improvements thereon will become readily apparent to those skilled in the art. Accordingly, the spirit and scope of the present invention is to be limited only by the following claims.

What is claimed is:

1. A rotational turbine comprising a hub and at least one blade attached to said hub; said blade curved along its entire length in the direction of the flow; wherein said blade has a cross section shaped with a thick leading edge, thin trailing edge, curved back and flat face; said blade further having a pitch angle that increases from the tip of the blade to the end of the blade adjacent to the hub; and said blade having a blade tip curved to point only in the direction of the fluid flow through the turbine to increase the ratio of the concentration of streamlines perpendicular to the cross-section of the turbine before and after the turbine.

2. A rotational turbine according to claim 1, wherein the curve of the blade tip is substantially elliptical.

3. A rotational turbine according to claim 1, wherein the curve of the blade tip is substantially circular.

4. A rotational turbine according to claim 1, wherein the curve of the blade tip is substantially shaped like a catenary.

5. A rotational turbine according to claim 1, wherein the curve of the blade tip is substantially parabolic.

6. A rotational turbine according to claim 1, wherein the curve of the blade tip is substantially like a double recurve bow.

7. A rotational turbine according to claim 1, wherein the shape of the blade is substantially like a scimitar.

* * * * *